United States Patent
Fredriksson (10) Patent No.: US 7,478,234 B2
(45) Date of Patent: Jan. 13, 2009

(54) DISTRIBUTED CONTROL AND MONITORING SYSTEM

(75) Inventor: Lars-Berno Fredriksson, Kinna (SE)

(73) Assignee: Timegalactic AB, Kinna (SE)

( * ) Notice: Subject to any disclaimer, the term of this patent is extended or adjusted under 35 U.S.C. 154(b) by 308 days.

(21) Appl. No.: 10/498,799

(22) PCT Filed: Jan. 7, 2003

(86) PCT No.: PCT/SE03/00009

§ 371 (c)(1),
(2), (4) Date: Jun. 16, 2005

(87) PCT Pub. No.: WO03/058468

PCT Pub. Date: Jul. 17, 2003

(65) Prior Publication Data

US 2005/0251701 A1    Nov. 10, 2005

(30) Foreign Application Priority Data

Jan. 7, 2002    (SE) .................................... 0200016

(51) Int. Cl.
*G06F 13/14* (2006.01)
(52) U.S. Cl. .................. 713/151; 710/240; 701/36; 701/45; 726/3; 370/465
(58) Field of Classification Search .............. 713/151; 710/240; 726/3; 370/465; 701/36, 45
See application file for complete search history.

(56) References Cited

U.S. PATENT DOCUMENTS

| | | | |
|---|---|---|---|
| 5,402,394 A | | 3/1995 | Turski |
| 5,574,848 A | | 11/1996 | Thomson |
| 5,600,782 A | * | 2/1997 | Thomson ........................ 714/4 |
| 5,694,612 A | | 12/1997 | Garmire et al. |
| 6,282,668 B1 | | 8/2001 | Neudecker |

(Continued)

FOREIGN PATENT DOCUMENTS

WO    WO-9854872 A1    12/1998

(Continued)

*Primary Examiner*—Abdelmoniem Elamin
(74) *Attorney, Agent, or Firm*—Connolly Bove Lodge & Hutz LLP; Myron Keith Wyche (57) ABSTRACT

In a more efficient distributed control or monitoring arrangement there are devices in control, monitoring and/or vehicle systems that comprise locally deployed module units that carry out one or more functions, and one or more links connecting the units. The respective module unit is connected to a link via a connection arrangement or a connection point and requisite communication device for the CAN protocol. A CAN control unit is arranged to receive indication of falling edges on the bus in question, and to carry out measurement of the time between falling edges using clock pulses in its clock function. Information from two or more such measurements forms the basis for calculation of a bit frequency currently used in communication on the bus by active module units connected to the same. The respective module unit comprises one or more communication devices that are free-standing or integrated in a microprocessor chip comprising at least a function performing microprocessor that is arranged with or interworks with at least one memory area. The content in the memory of a first module unit is readable and/or writable via the link from a second module unit in the system without significant assistance from the function performing microprocessor in the first module unit.

30 Claims, 5 Drawing Sheets

U.S. PATENT DOCUMENTS 6,377,825 B1 * 4/2002 Kennedy et al. ......... 455/569.2
6,577,269 B2 * 6/2003 Woodington et al. ........ 342/196
6,959,403 B2 * 10/2005 Dierauer et al. ............... 714/49
7,065,152 B2 * 6/2006 Gottshall et al. ............ 375/285
7,148,723 B2 * 12/2006 Watkins ....................... 326/62

FOREIGN PATENT DOCUMENTS

WO    WO-0184286 A2    11/2001

* cited by examiner

DISTRIBUTED CONTROL AND MONITORING SYSTEM

The present invention relates to a distributed control or monitoring system with arrangements in control, monitoring and/or vehicle systems that comprise locally deployed (distributed) module units (nodes) that carry out one or more functions, and one or more links connecting the units, the respective module unit being connected to the link in question via a connection arrangement or a connection point or requisite communication device, preferably for the CAN protocol.

The CAN system (Control Area Network) is now well-known in various connections for control, processes, monitoring, etc. Among other things, it is used in various vehicle applications in order to control various functions and processes in the vehicle. In addition, it is used for function control in mechanical equipment, for example within the construction industry, in weaving sheds, etc. Reference can be made to the patent literature and the patent applications and patents that have been submitted or obtained by the applicant of this patent application.

In connection with control and monitoring systems of this type, there are continuing efforts to make the system as such more efficient, to improve it and to make it cheaper, and to coordinate different system principles for easy transferability so that part or parts of a system type can be transferred to and coordinated with other system types. Thus, for example, in their construction, principles and technology the module units must be able to be transferred simply to other systems and co-ordinated with the principles valid therein. The present invention has the object of solving this problem.

Thus, for example, a well-known problem in CAN systems is that a module unit with incorrectly set bit speed can corrupt all communications. The solution to this has been to introduce a silent mode, that is a node that is connected just listens to the traffic and does not transmit any signals until it has received a correct message. For example, CanKingdom uses this method. This method ensures that an incorrectly configured node does not corrupt the communication to or from other nodes, but the problem remains of making contact with the faulty node. CanKingdom prescribes that for a short period of time the node is to be set to 125 Kbit/s and is to await a special message. If this arrives within the prescribed time, the bit frequency 125 Kbit/s is retained, otherwise it changes to the set bit speed. Other CAN HLPs (CAN Higher Layer Protocols) have chosen to send signals only on one or a few bit frequencies. J1939 uses 250 Kbit/s, DeviceNet uses 125, 250 and 500. SDS uses 125, 250, 500 Kbit/s and 1 Mbit/s. A newly connected module can thus switch between the given frequencies and fairly quickly set itself to the correct frequency. SDS has also a method for measuring the bit speed used. Both the methods have serious defects. The use of a small number of frequencies restricts the ability to optimize a system economically and functionally. To commence by listening on a given low frequency is in practice only possible if the module is connected to a tool, which in turn involves active participation by service personnel. There are a number of methods for measuring the bit frequency used on the bus using signal analysers, but such instruments are expensive and take up a lot of space. The need remains for modules themselves to be able to adapt in an active system to a bit frequency that is optimal for the system. The invention also intends to solve this problem.

The CAN protocol uses falling edges on the bus for synchronization and detection of bits on the bus. Thus it is crucial to detect falling edges on the bus in order for a newly connected module to be able to determine by measurement the bit frequency used in the system. Problems can thus also arise by an interference generating a falling edge that does not belong to a bit and thereby generating an incorrect bit time. In a system without interference, the edges will not always be completely synchronized with the bit time during the arbitration sequence as the same bit can be transmitted by several modules at the same time. The invention also takes this problem into account.

There is a need to be able to identify HLP via the CAN bus and to be able to set up and monitor the message traffic on the bus and to verify the system's integrity at system level, for example using CanKingdom. Another problem in connection with CAN is being able to verify various delays. The invention also considers this problem.

There is also a need for arrangements and devices that work with principles that simplify the main software in the respective modules concerned. There is also a need to be able to achieve a better and more effective division of functionality between different CPUs in the system. There is also a need to be able to strengthen the distinction between module and system responsibility in connection with the production of systems of this type. Similarly, there is a need for rapid phasing in to global time where this is used. The invention also solves this problem.

According to the concept of the invention, the problems listed above are solved by utilizing known but seldom-used characteristics of a CAN message and utilizing functions that are already to be found in CAN control units, which in certain respects go against prejudice and inertia in the field and thus break new ground for the technique.

A CAN message is introduced by a falling edge, Start of Frame (SOF). A CAN message is thereafter concluded by seven bit times without falling edge and at least two consecutive bit times pass before a falling edge appears (SOF of next message). The field for data length (DLC) is always preceded by three dominant bits if the data field contains data. CAN is of the type Non Return to Zero (NZR) and two consecutive falling edges can occur at the earliest after two bit times. All CAN control units detect falling edges and all CAN control units have an internal clock that generates pulses for the determination of the bit time. In a CAN system without interference the bit speed can be determined by starting a clock (pulse counter that counts internal clock pulses) at a first falling edge and stopping it after the next edge. Sooner or later the sequence 0,1,0 occurs. The first 0 is introduced by a falling edge that is detected and starts the clock. The following 1 is introduced by a rising edge that is not detected, while the following 0 is introduced by a falling edge that is detected and stops the clock. The measured time is two bit times (0 and 1). By taking measurements over a longer period of time and selecting the shortest measurement and dividing by two, the bit speed is obtained for the system in question counted in clock pulses. Using this value, fixed logic or a CPU can set the CAN control unit to the correct bit speed. Among other things, this method or principle constitutes a basis for the invention.

A special CAN message is selected to synchronize newly-connected nodes. (For example, the CAN Std identifier 10101010011 can be selected with a DLC that is introduced by 10, that is with the value 8 or higher. The given sequence generates on the bus the bit sequence ,01,01,01,0011,0001,0 where falling edges are marked by the comma sign (,). The following sequence is carried out:

0. The clock counter is zeroed
1. At the first edge detection, the counter is started
2. At the second edge detection, the value V1 in the counter is captured 3. At the third edge detection, the value V2 in the counter is captured
4. The integer calculation V2−V1−V1=X is carried out
5. If |X|<V1/4 continue, otherwise return to point 0 above
6. At the fourth edge detection, the value V3 in the counter is captured
7. The integer calculation V3−V2−V1=X is carried out
8. If |X|<V1/4 continue, otherwise return to point 0 above
9. At the fifth edge detection, the value V4 in the counter is captured
10. The integer calculation V4−V3−V1=X is carried out
11. If |X|<V1/4 continue, otherwise return to point 0 above
12. At the sixth edge detection, the value V5 in the counter is captured
13. The integer calculation V5−V4−2×V1=X is carried out
14. If |X|<V1/4 continue, otherwise return to point 0 above
15. At the seventh edge detection, the value V6 in the counter is captured
16. The integer calculation V6−V5−2×V1=X is carried out
17. If |X|<V1/4 continue, otherwise return to point 0 above
21. At the eighth edge detection, the value V7 in the counter is captured
22. The integer calculation V7−V6=X is carried out
23. The bit speed is determined as X/4

In the example above there is a great possibility that the "correct" message will be captured and the bit speed is calculated using the bits in the DLC code, that is only the module with the bit speed message transmits on the bus giving the best quality for the bits. A final check that the bit speed is correct is obtained by a message on the bus, which can be any message at all, being correctly received after setting the bit timing register to the calculated bit speed. Thereafter the module can participate in the communication according to the CAN protocol. It is recognized that using the principle of the invention it is possible to construct in a simple way similar algorithms that are in principle equivalent.

Thus, for example, a longer string can alternatively be used, for example a message where the data is filled with alternating 0 and 1. This gives four falling edges per byte which gives 32 falling edges in the data field. By checking that each change lies within ¼ of the preceding change as above in order for the process to continue and by keeping count of the changes, it is possible in a simple way to introduce the requirement that 32 falling edges must finally have occurred and thus calculate the bit length either as the time of the last change divided by two or the whole time divided by 64. This principle has the advantage that the bit pattern only occurs in a data field and it is therefore possible to ensure in a simple way that the bit pattern has been transmitted by a single transmitter. If the 01 pattern is longer than 18 bits, it must occur in the data field. It is thus sufficient to have 3 bytes in the data field in order for the method or the principle to work. However, the probability increases of an arbitrary module in the system transmitting the bit pattern by chance. An alternative to zeroing the clock counter is to let it be free-running. As the time is monotonously increasing, it is known whether the counter has pulsed or gone round in the case in question and this can be taken into account. An advantage of this method or principle is that it can be implemented in a simple way and that it is known with certainty that the synchronization message is only received from the selected module or modules. The following sequence can thereby be obtained.

```
"The clock value is captured at every falling edge
Begin
    At edge detection, store captured time value V1
    At edge detection, capture time value V2
    Start Set Edge counter C1 to 0
    V2 − V1 = V
        Repeat until C1=31
        increment C1 by 1
        At edge detection, capture time value V3
        If |(V2 − V3 + V)| > V/4 then
        V1=V2
        V2=V3
        go to Start
        END If
        END repeat
        (V3 − V1)/64=B
        Store B
        Generate interrupt
END".
```

B is the bit frequency in question.
Alternatively:

```
"BEGIN
    C1=0
    At falling edge, capture V
    V1=V
    At falling edge, capture V
    V2=V
    LABEL (COUNT)
        At falling edge, capture V
        V3=V
        C1=C1+1
        IF |(V2 − V1) − (V3 − V2)| < (V2 − V1)/4
        THEN
            IF C1=32
            THEN
                BITTIME = (V3 − V2)/2
                Generate interrupt
                GOTO END
            ELSE
                V1=V2
                V2=V3
                GOTO COUNT
            END IF
        ELSE
            V1=V2
            V2=V3
            C1=0
            GOTO COUNT
        END IF
END".
```

The invention utilizes here the bit sequence 1010 . . . . It can be considered to be a requirement that the CAN identifier must contain at least one 1 in order for the method or principle to be able to work. This is, however, not the case, as in the case with the CAN identifier zero the CAN protocol will insert stuffing bits into the bit sequence that ensure the requisite changes in the bit sequence in front of the 1010 . . . sequence.

Many CAN HLPs have a special intentifier for system control messages. A development of the invention is to utilize the autobaud message to provide information also about this. The bit pattern 10101 . . . can be increased to 68 bits by setting DLC to 10 (decimal). This value is permitted according to the CAN protocol, but seldom used. In a first step, a newly-connected node can set itself to the correct bit speed and then wait for the next message with the bit pattern. This is now received as a conventional message with the CAN identifier for system control messages. These can then be received in the normal way with DLC 8 or lower. DLC 10 thus indicates that the data field is a bit pattern for autobauding. There is currently no proposal (standard) for identifying HLP via the CAN bus, but it should be possible to do this by utilizing the last byte in the pattern message and/or the DLC value. Utilized CAN identifiers must contain at least one 1 and one 0.

According to the above, a common problem in connection with CAN is verifying different delays. At the lowest level there are signal delays in the driver stage and the cabling. By designing a CAN control unit so that it can transmit a dominant bit during otherwise silent mode and at the transmission freeze the clock value and then freeze the next value when the input side detects the edge on the bus, the intrinsic delay can be calculated. Another module connected to the bus detects SOF and counts recessive bits. After five such bits, an error is indicated and the next bit is set to 0, that is the first bit in an error frame. The falling edge is detected and the measuring node can now calculate the signal delay plus seven bit lengths generated by the measured module. The time is, however, in the measuring module's local time, which can differ from the measured module's local time. The bit time can be obtained by the measured module transmitting the synchronization message as above. An alternative to this is to freeze the time at SOF and the last falling edge in the message. As the message has been received, the exact number of bits can be calculated and the measured module's clock can thereby be set in relation to the measuring module's clock with greater precision. The delay times can be measured in a complete system by setting only one module at a time in signal mode and the others in silent mode. This can be carried out easily if the modules are configured for CanKingdom. Measuring modules are, of course, in measuring mode in order to be able to generate a dominant bit during an otherwise silent mode.

Another embodiment of the invention is that the CAN control unit's pulse mode is arranged in such a way that in the transmit state a pulse is transmitted with only one bit quantum, while in the receive state a bit quantum is sent as soon as a falling pulse is detected. The measurement is simple:

"At edge detection, store captured time value V1
At edge detection, capture time value V2
Delay=V2−V1".

The execution time for an application in the target module can then be measured by a command being sent to the module so that it executes the application and by measuring the time until the response is received. This time is then reduced by the transmission time.

The flexibility of a CAN control unit can be greatly increased by integrating a CPU in the circuit. This CPU is arranged principally to carry out instructions that concern messages on the bus and real-time tasks including the detection of edges appearing on the bus. Falling edges are preferably detected, as these are actively driven, but alternatively or in addition rising edges can also be detected and analysed. For example, information about connection resistance and cable quality is obtained by measuring rising edges (changes from 0 to 1). A CPU alternative can be advantageous for technical or economic reasons. For example, HLP Volcano, used in cars by Volvo, requires there to be three send buffers in order to ensure that a message will have access to the bus with the correct priority. A CAN control unit with a CPU would only require one send buffer if it is synchronized as regards instructions with the bit sequence on the bus during transmission or reception. As the CPU only handles tasks relating to communication, according to the invention such a requirement can be fulfilled. In addition, hardware buffers and filters can be replaced by RAM areas and software. It is thereby possible to choose between using available memory for filters or to store message information. In addition, the content in the messages can be presented to the module's main CPU in a more effective way. Signal values can be packed or unpacked into or out of CAN messages according to an HLP, which simplifies the writing of the module's main software. The time synchronized CAN standard N1147_CD11898-4 proposed in ISO can, in accordance with the invention, advantageously be implemented in a CAN control unit with CPU, counter, RAM memory, flash memory, counter and an interface, for example SPI, to the main CPU in a module. With an implementation of CanKingdom in a system, the CAN control unit with its CPU can be programmed to carry out most of the tasks of a Mayor and all the tasks of a Postmaster according to King's Letters. By providing the CPU with a reduced set of instructions, if necessary supplemented by special instructions for this special purpose, and by synchronizing the execution of the instructions with CAN control unit functions such as, for example, bit sampling and the previously mentioned edge detection, and by making internal registers such as bit counter, error counter, etc, available for reading and if required also for writing, a CAN control unit of this type can be used for advanced analysis tasks, which are of the greatest importance for security-critical systems. The proposed division in CanKingdom between system responsibility and module responsibility can be made clearer and reinforced in a distinct way.

A more concrete characteristic of the invention is, among other things, that a CAN control unit (CAN Controller) is arranged to receive indication of falling edges on the connection (bus) concerned and that the CAN control unit is arranged to carry out measurement of the time between falling edges using clock pulses in its clock function. The information from two or more such measurements is used as the basis for calculating a bit frequency currently used in the communication on the connection (bus) by active module units (nodes) connected to the same. The invention can alternatively or in addition also be principally characterized in that the connection arrangement or connection point for a first module unit comprises one or more communication devices (for example CAN Controllers and CAN Transceivers) that are free-standing or integrated in a microprocessor chip that comprises at least a function performing microprocessor. The latter is arranged with or can interwork with a memory, the content of which can be read and/or written via the connection from a second module unit in the system without significant assistance from the function performing microprocessor in the first module unit. Alternatively or in addition, the connection arrangement or connection point for a module unit can comprise one or more communication devices that are free-standing or integrated in a microprocessor chip that comprises at least a function performing microprocessor (CPU) which is arranged to carry out instructions synchronously with and/or by interworking with the CAN control unit's state machine.

The communication device can advantageously contain an integrated CPU arranged at least at the detection of a falling edge, or alternatively SOF, in a sequence to be synchronized concerning instructions with the CAN control unit's state machine during reception or transmission of messages on the bus.

Further developments of the concept of the invention will be apparent from the following subsidiary claims.

A currently preferred embodiment of an arrangement according to the invention will be described below with reference to the attached drawings in which.

Figure 1:
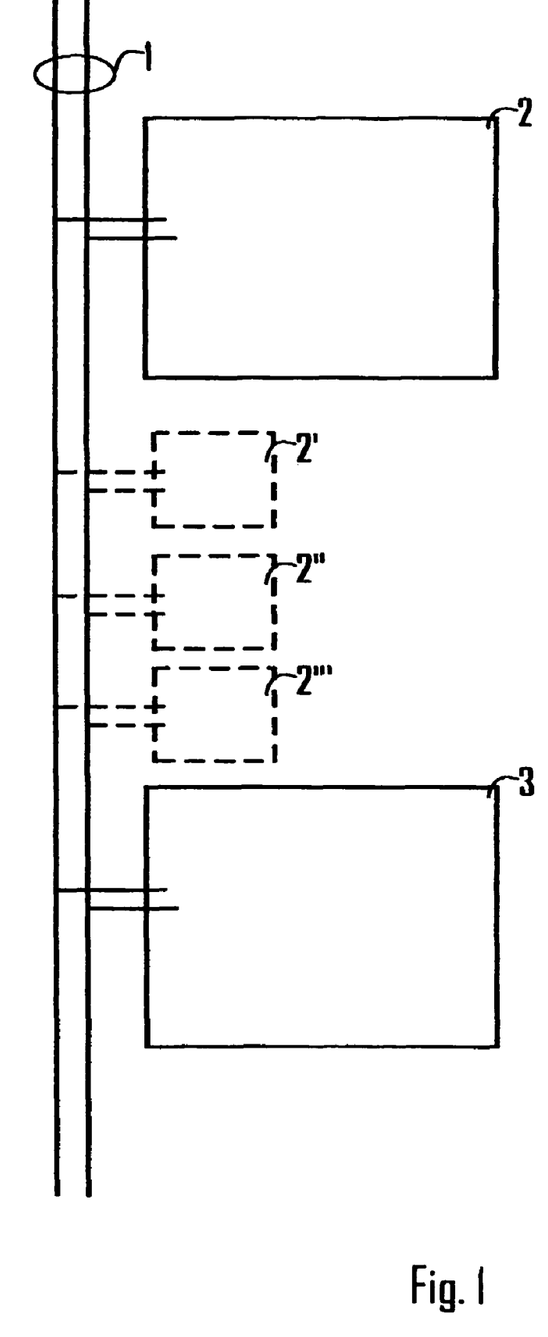
FIG. 1 shows in block diagram form and in outline a control and/or monitoring arrangement with module units that can be connected to each other via cable-based and/or wireless connections (busses) in a system.

FIG. 1 shows an outline CAN system. A number of modules 2, 2', 2'', 2''', which have different functions in the system, and a module 3 that has general system functions, for example such as Capital in CanKingdom, are connected to a CAN bus 1.

Figure 2:
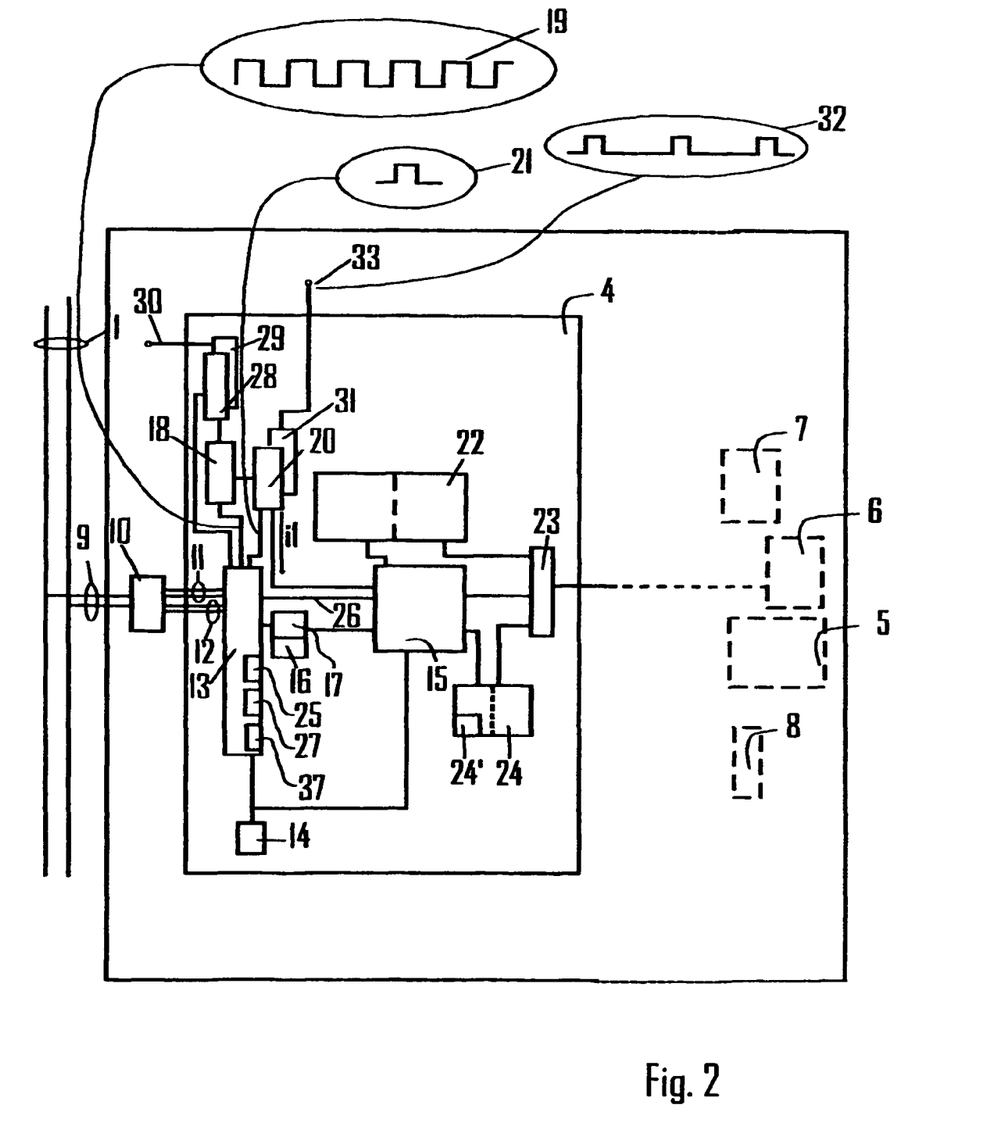
FIG. 2 shows in block diagram form and in outline a module incorporated in the arrangement.

FIG. 2 shows a module in a CAN system where the essential components for the invention, the CAN control unit, are indicated by 4 while other generally occurring parts, for example the module's CPU 5, interface to the CAN control unit 6, memory 7, etc, are only shown in outline. Other components are symbolized by 8. The module 2 is connected to the CAN bus via the connection 9 to the CAN driver stage 10 in the normal way. The driver stage can be any appropriate type for CAN, for example type 251. This is in turn connected to the CAN control unit via the TX connection 11 and RX connection 12 to the CAN control unit's normal functions 13. The oscillator 14 drives the state machine in 13 and the CPU 15. It can also be common to the module's CPU 5. The CPU 15 is connected to 13 via the message buffers 16 for transmission and 17 for reception. The unit 4 has, in addition, one or more counters 18 that are driven by pulses 19 from 13, or alternatively directly from 14. The counter values can be captured and frozen in the memory buffer 20 at a pulse 21 from the unit 13 and locked as information i1 by the CPU 15 and saved for further processing in the RAM memory 22. This memory can be shared with and utilized by the module's CPU 5 via the interface 23. For non-volatile information there is a flash memory 24 that can also be shared between the CPUs if appropriate. A part of this memory, 24', can be arranged in such a way that it can only be programmed once and then can only be read, which can be used to give the module a unique identity at the time of manufacture. The CAN control unit core 13 contains a number of registers according to the CAN standard, for example error counters for send messages and receive messages symbolized by 25, which can be read and if required also written by the CPU via the connection 26 which symbolizes the requisite connection leads for exchanging information between the CAN control unit and the CPU.

The CAN control unit core's internal signals at detection of falling edge, rising edge, sampling point, upon the detection of errors in messages during transmission or reception, upon ascertaining error-free received or transmitted message, etc, generate pulses for freezing the time values in the registers 20 of the unit 27 and interrupt to the CPU 15 via the connection 26. A register with comparator 28 is arranged in such a way that the CPU 15 can write a time value and when the corresponding value is reached in the counter 18 a pulse is generated to the unit 13 that triggers it to transmit the message that is currently in the buffer 16 for transmission. One or more similar units 29 can be arranged for other functions, by generating a signal on an output 30 at certain times. This signal can trigger other functions on the module, for example taking a measurement, opening or closing the output for transmission in the CAN drive stage 10, etc. A memory buffer 31, that is in connection with the CPU 15 in the same way as the buffer 20, is arranged to freeze the counter value at a signal from an external unit 32 via the connection point 33. The external signal can come from a signal generator or from GPS for generating a time reference to an external source which the local time generated by the oscillator 14 can be set in relation to. The function can also be used for time sampling of events in the module. The bit timing register of the CAN control unit is symbolized by 37.

EMBODIMENT

Autobauding

Figures 3, 4:
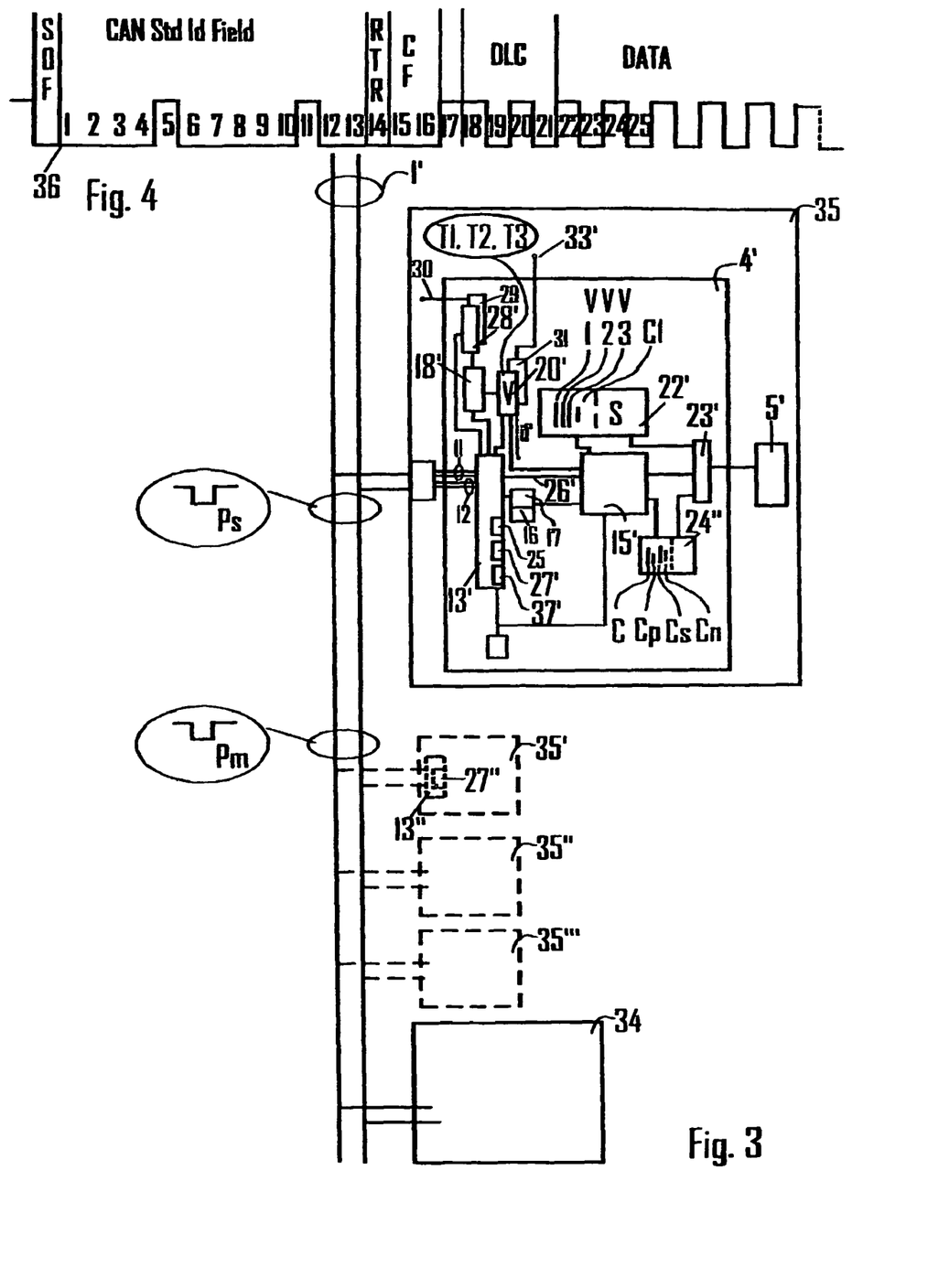
FIG. 3 shows in block diagram form and as a percentage the arrangement in a more detailed embodiment in connection with autobauding.
FIG. 4 shows in diagram form the construction of a bit pattern between active modules in a system according to FIG. 3.

In a system according to FIG. 3, the modules are programmed according to CanKingdom with the Capital module 34 and the City module 35 connected to the CAN bus 1'. Additional modules 35', 35'' and 35''', are connected in the same way. All the modules have a CAN controller 4' in accordance with the above, cf. FIG. 2. The module 35 is configured for autobauding, that is in silent mode and for indicating falling edges. The King sends the synchronization message 1,0,1,0,1, ... with the CAN std identifier 0 and DLC 10, see FIG. 4. The bus levels including stuffing bits for this are shown by 36 in FIG. 4. For the sake of simplicity, it is assumed that the counter 18' according to FIG. 3 is incremented by 1 for each bit time and that the following algorithm is used:

```
"BEGIN
    C1=0
    At falling edge, capture V
    V1=V
    At falling edge, capture V
    V2=V
    LABEL (COUNT)
        At falling edge, capture V
        V3=V
        C1=C1+1
        IF |(V2 − V1) − (V3 − V2)| < (V2 − V1)/4
        THEN
            IF C1=32
            THEN
                BITTIME = (V3 − V2)/2
                GOTO END
            ELSE
                V1=V2
                V2=V3
                GOTO COUNT
            END IF
        ELSE
            V1=V2
            V2=V3
            C1=0
            GOTO COUNT
        END IF
END".
```

At SOF in FIG. 4, the falling edge is detected by the unit 27' in the unit 13' (FIG. 3) and generates a pulse to 20' that captures the current value V in the counter 18', let us say 10. The CPU 15' is notified that the value in 20' has been changed, reads this off via the information channel i1' and stores it as V1 in the memory 22'. The next falling edge comes between the bits 5 and 6 in the pulse train 36. V is now 16 and is stored as V2 in the same way as above. The next falling edge comes between the bits 11 and 12 and the value 22 is stored as V3. The value C1 in the memory 22 is set to 1 and the If-value is calculated 16−10−22+16<(16−10)/4, that is 0<3/2, which is true, therefore V1 is set to 16, V2 to 22 and the next falling edge is awaited. This comes between the bits 18 and 19, that is V3=29 and C1=2. The If-value is 22−16−29+22<(22−16)4, that is 1<3/2, and the sequence is repeated. The next falling edge comes between the bits 20 and 21 and we have C1=3, 29−22−31+29<(29−22) and 5<7/4 which is false, therefore C1=0. The next falling edge comes between the bits 22 and 23 and we have C1=1 and 0<1/2 which is true and the sequence continues at COUNT. This will be repeated up to the edge between the bits 84 and 85 where C1=32 and BITTIME is calculated as 1. The CPU now sets the bit timing register 37 and awaits the King's next autobaud message.

Communication Control from System Level.

The King sends alternating autobaud messages and King's Letter with Page 1. The City module receives each message until it receives a message with DLC 10 (FIG. 4) and the data field alternating 1,0,1,0, . . . , that is the King's autobaud message. When this arrives, it has the CAN identifier Std 0 and it can then be determined that the King's messages come with this identifier. The next time the King sends King's Letter Page 1, the City module receives this and can then follow the CanKingdom protocol. The King can now control the module's communication largely independent of the main CPU 5' which can write and read values of signal level according to Presentation List in the memory 22' via the interface 23', either directly if the memory is two-port or via the CPU 15'. This can pack and unpack the signals in Letters according to CanKingdom with instructions from the King. The software for the CanKingdom protocol, symbolized by C, has previously been downloaded in the flash memory 24" and the parameter values from the King, Cp, are also advantageously stored there. The King can also download system information Cs in the flash memory via the CPU as backup for its own memory and/or to allow replacement of Capital modules in the system. The new King can thus obtain requisite system information for being able to monitor and control the system from one or more Cities in the system. In order to protect the system from unauthorized manipulation, the information can be protected via cryptography or access codes. Keys for these, Cn, can also be written and stored in the flash memory. The King can also download new software if applicable. Because of the CPU allocated to the CAN control unit, the system designer is able to optimize and secure the system, without endangering other functions in the module that are handled by the main CPU in the module.

Test Mode

A big problem in CAN system is that the actual signal delay between the different modules in the system and the oscillator tolerance of the respective modules are unknown. These values are input parameters for calculation of suitable bit speed in the system, but in practice practically impossible to measure, for which reason data sheet information and guesswork form the basis for the selection of the bit speed. By introducing a test mode in the CAN control unit according to the following the problem is solved. The CPU 15' sets the CAN control unit core 13' in test send mode via the connection 26'. The register 28' is set to a value which greatly exceeds the expected maximal delay. In test send mode, on request for transmission a message in the send buffer is not transmitted, but instead just a dominant pulse with the length one bit quantum according to the setting in the bit timing register 37' and at the same time the counter value is frozen in 18' in 20' which can hold at least three consecutive time values T1, T2 and T3. The value T2 is frozen when the unit 27' detects the pulse's falling edge on the bus and T3 is frozen when the next falling edge is detected, whereupon the CPU receives an interrupt via the connection 26' that indicates that the measurement is completed. If no edge is indicated before the unit 28' generates a time out pulse, the measurement is terminated when this occurs. In order to simplify the description here, it is assumed that CanKingdom is used and that the King resides in the module. The King now orders all Cities into silent mode and his CAN control unit into test measurement mode. Thereafter he requests transmission. The pulse Ps is sent at the same time as T1 is frozen, T2 is frozen and the measurement is terminated by the time out value in 28' being reached. This indicates that the bus is free of interference and well terminated. He now orders the CAN control unit in one of the other Cities, for example 35', into measurement receive mode. In measurement receive mode, the unit 13" transmits a pulse Pm of the same type as Ps when the unit 27" detects a falling edge on the bus. Thereafter the King requests transmission again and three new values T1, T2 and T3 are obtained. T2-T1 is the internal delay in the module and T3-T2 is the delay in the module 35' plus the cable delay measured in the module's time units. This can, as mentioned earlier, be calibrated to an external reference via 33'.

In addition, the King can also simply measure the accuracy in the oscillators in the different modules in comparison with his own by ordering them one at a time to send one or autobaud message, set the others in silent mode and set his own CAN control unit in autobaud state. His own CAN control unit will then measure the sending module's bit length, which is directly proportional to the oscillator frequency in the sending module.

Memory Saving

Figure 5:
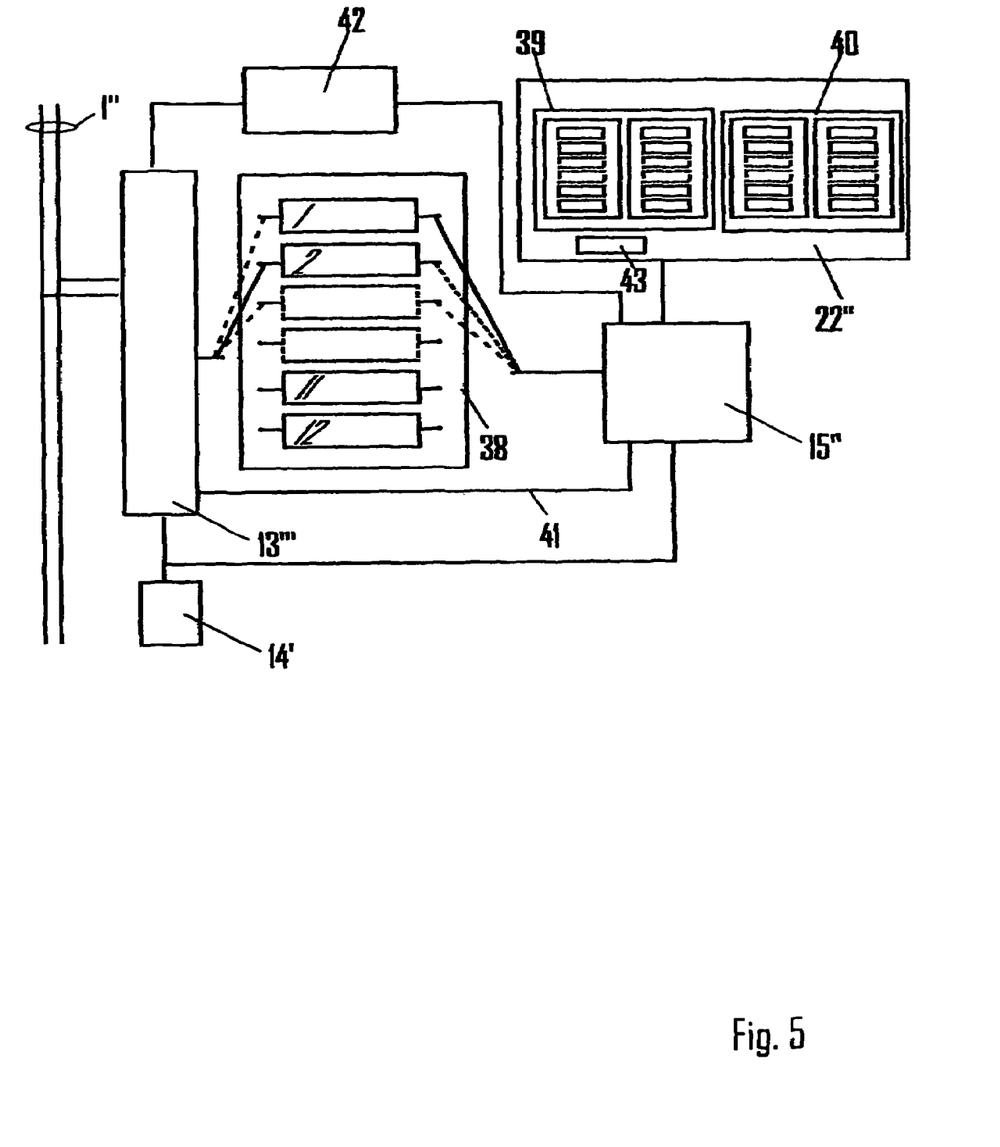
FIG. 5 shows in block diagram form and in outline the arrangement in connection with among other things memory functions.

It is considered in general that a good CAN control unit must have at least three sending buffers and two receiving buffers. These are of the two-port type and hence expensive. By introducing a CPU in the CAN control unit, one buffer is sufficient. FIG. 5 shows a construction in outline. This is driven by the oscillator 14', utilizing the fact that the CAN control unit 13''' and the CPU 15" operate synchronously, and knowledge of the construction of the CAN messages. The payload in a CAN message contains a maximum of 93 bits. Other bits that appear on the bus are added by the sending CAN control unit. A transceiver buffer thus needs to contain 12 bytes and is shown in the Figure as 38. Each byte can be read or written either by the unit 13''' or 15". In the RAM memory 22' an area 39 has been reserved for messages that are to be sent and an area 40 has been reserved for received messages. The CPU receives information via the connection 41 about the status of the CAN control unit and via this connection it can also give orders to the CAN control unit. When a falling edge is detected by 13''' on the bus 1", the time value in the time counter 42 is frozen. When the CAN control unit has determined that it is an SOF, the CPU is informed, which copies the time value in 42 into the RAM memory in the area 43. The reception continues and the CC has now the sole right to write in the memory 38. When the data field has been read in, all message information is immediately thereafter available in the memory 38 and the CPU can now exclusively read the memory and transfer the information to the memory area 40. During this time, the usual CAN control unit in 13''' continues and when the message is found to be correct the CPU is informed and it can then use the value in 40 and 43 for further processing. If the message is rejected, the CPU is informed immediately of this and can then obtain all information concerning error type, bit where the error was detected, etc, via the connection 41. There is ample time for this when the bus is occupied with error frames. When transmitting, the CPU copies the first byte in the identifier field of the message that has the highest priority in the queue of messages for transmission in the memory area 39 and requests transmission of 13'''. When this detects the edge in its SOF, the value in 42 is frozen and the CPU continues to copy the remaining information from the message. If this is to be time-stamped, the value in 42 is copied in the space intended for it according to valid CAN HLP. It can occur that 13''' can read the preceding byte, for example 1, while the CPU writes in the next byte, for example 2 or higher. If there is no bus arbitration, then 13''' takes over the memory 38 and writes over any information in this and the CPU changes to the reception sequence. Depending upon how 13''' is constructed, the memory depth must be able to be reduced to three bytes. In this case, byte 1 is available for writing by 13''' and byte 2 available for writing by the CPU. When transmitting, 13''' starts to read byte 2 while the CPU writes in 3 and thereafter in 1. If a message arrives while the CPU is writing in 2, it interrupts the transmission activity and reads 1 while 13''' writes in the now free area 2, and so on.

Global Clock

Figure 6:
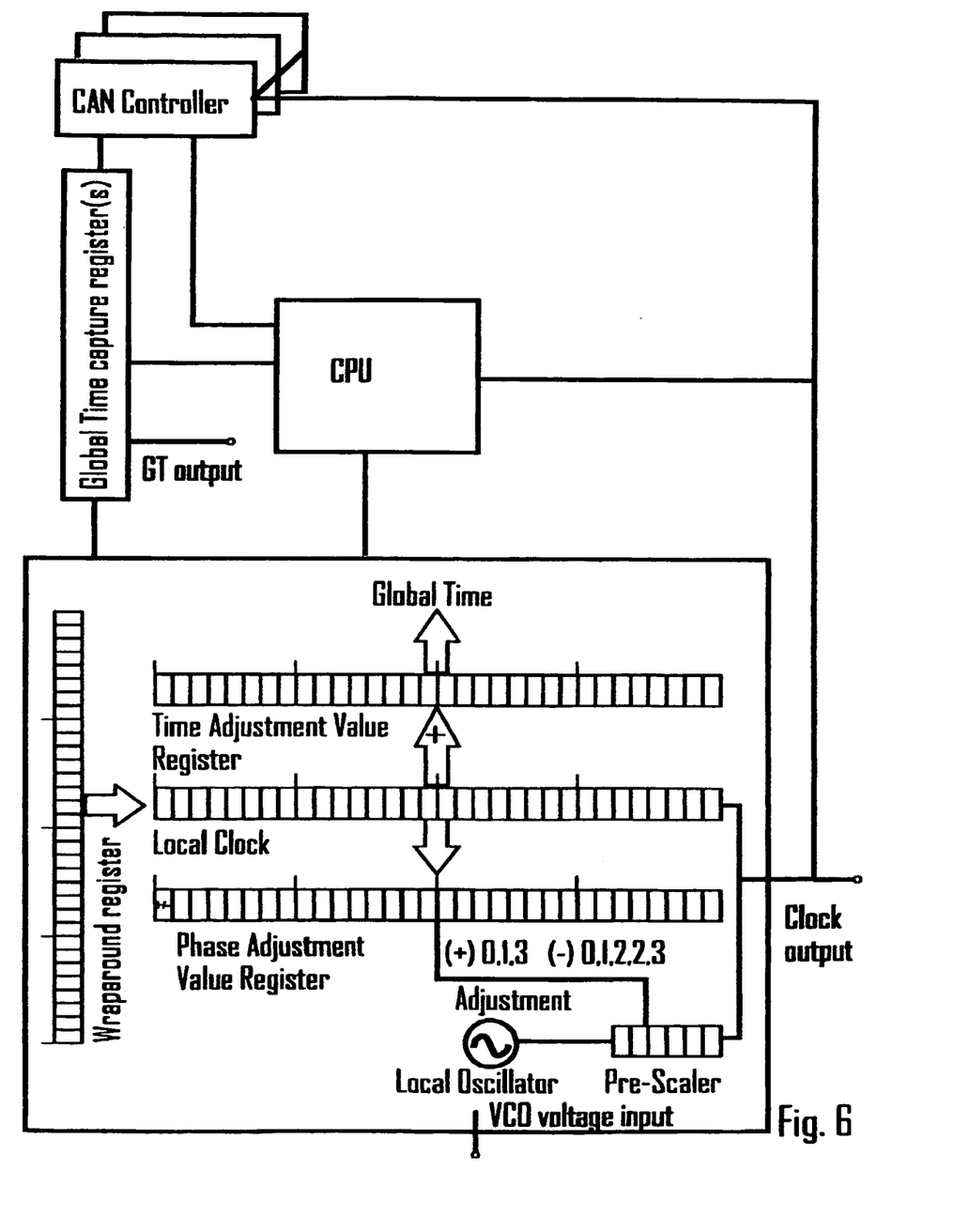
FIG. 6 shows in block diagram form and in outline the clock functions of the arrangement.

There is a wish to introduce a common time in CAN systems and reference is made to ISO's current work with such a standard called Time Triggered CAN (TTCAN). A further development of the invention is to let a hardware-based clock module of an essentially known type form the basis in the clocking or time indication for the CAN control unit and the CPU and to implement TTCAN in software. FIG. 6 is intended to illustrate this in outline form. The clock unit is driven by an oscillator, which can be of VCO type if great accuracy is required. The outgoing clock frequency is adjusted with a pre-scaler that generates a clock pulse after a certain number of pulses N from the oscillator. The outgoing pulse frequency is adjusted by a pulse being sent out either at N+1 or N−1 when the value in the Phase Adjustment Value Register is reached. In this way the clock can be adjusted. The statistical error is corrected by the value in the Time Adjustment Value Register being set to the local time for display. The register values can be calculated and written in by the CPU. An advantage of this solution in comparison with normally available clocks without processors is that the phasing-in to global time is carried out much more quickly. With a design such as this, CPUs in a complete CAN system can be synchronized in time. Applications in different modules can be executed synchronously at selected times and scheduling of message transmissions can be carried out with great accuracy. If the unit is provided with additional CAN control units or units for other protocols, very effective gateways can be created between different networks which all have a common time. This applies in particular if the time is adjusted to the GPS system's time or if there is interworking with other time-controlled systems such as Bluetooth, GSM, etc. Other units of the module are able to read the global time via GT output and have access to the clock frequency via Clock output.

The invention has been described above with the alternative that the modules are equipped with a main processor that is arranged to carry out the main function of the module and with a processor in the communication unit that is arranged to be synchronized with bit sequences appearing on the communication bus. The solution is thus based on functional division between microprocessors. An alternative to this is to use the invention with a solution that is based on time division. In such a case, the microprocessor is arranged to carry out instructions relating to communication problems co-ordinated with the appearance or generation of SOF on the bus. A particular time slot is allocated for this. During other times the microprocessor can carry out instructions relating to the main function of the module.

The invention is not restricted to the embodiment described above, but can be modified within the framework of the following patent claims and invention concept.

The invention claimed is:

1. Distributed control or monitoring arrangement comprising:
    devices in or belonging to control, monitoring and/or vehicle systems that comprise separate or locally deployed (distributed) module units (nodes) that carry out one or more functions, and
    one or more links connecting the units, the respective module unit being connected to the link in question via a connection arrangement or a connection point or requisite communication device for a CAN protocol,
    characterized in that the connection arrangement or connection point for a first module unit comprises one or more communication devices that are free-standing or integrated in a microprocessor chip comprising at least a microprocessor (CPU) which is arranged to carry out instructions synchronously with and interworking with both a state machine of a CAN control unit and a transceiver buffer, wherein each byte of the transceiver buffer is configured to be at least one of read and written by the CAN control unit and the microprocessor.

2. Distributed control or monitoring arrangement comprising:
    devices in or belonging to control, monitoring and/or vehicle systems that comprise separate or locally deployed (distributed) module units (nodes) that carry out one or more functions, and
    one or more links connecting the units, the respective module unit being connected to the link in question via a connection arrangement or a connection point or requisite communication device for a CAN protocol,
    characterized in that the connection arrangement or connection point for a first module unit comprises one or more communication devices that are free-standing or integrated in a microprocessor chip comprising at least a microprocessor (CPU) which is arranged to carry out instructions synchronously with and interworking with a state machine of a CAN control unit, and
    characterized in that the CAN control unit (CAN Controller) is arranged to receive indication of falling edges on the link (bus) concerned, in that the CAN control unit is arranged to carry out measurement of the time at and/or between falling edges using clock pulses in its clock function, in that information from two or more such measurements forms the basis for calculation of a bit frequency currently used in communication on the link (bus) by active module units (nodes) connected to the link.

3. Arrangement as claimed in claim 2, characterized in that one of the said module units (nodes) in the system is arranged to transmit a message with one or more sequences of previously known bit patterns in order to make it easier for module units (nodes) connected to the system with incorrectly set bit frequency to determine the correct bit frequency and set themselves to this.

4. Arrangement as claimed in claim 3, characterized in that the bit pattern is constructed of even multiples of the bit time for the bit speed used in the system.

5. Arrangement as claimed in claim 3, characterized in that the bit pattern corresponds to all or part of a CAN identifier and/or existing data field and/or DLC field.

6. Arrangement as claimed in claim 5, characterized in that the bit pattern is arranged to be able to be connected with matching of DLC with a value larger than eight.

7. Arrangement as claimed claim 2, characterized in that the system is arranged to work with messages with dual function, namely to contain a bit pattern for measurement of the used bit time, and to indicate that the DLC field and/or data field contains further information for making possible the integration of the module unit (node) into the system.

8. Arrangement as claimed in claim 2, characterized in that one or more units that are temporarily or permanently connected, that determine the system function and are at a higher level than the module units are arranged to carry out reading and/or writing in the respective memory area concerned without significant assistance from the respective function performing microprocessor.

9. Arrangement as claimed in claim 1, characterized in that a function performing microprocessor is arranged to carry out writing and reading of content/information in a memory area concerned.

10. Arrangement as claimed in claim 1, characterized in that a function performing microprocessor in the module unit concerned and/or in one or more of the other module units connected to the link is/are arranged to write-protect a content/information.

11. Arrangement as claimed in claim 10, characterized in that a write-protection function employed works with cryptography and/or access codes.

12. Arrangement as claimed in claim 1, characterized in that a memory area or memory contains an identification of the module unit.

13. Distributed control or monitoring arrangement comprising:
- devices in or belonging to control, monitoring and/or vehicle systems that comprise separate or locally deployed (distributed) module units (nodes) that carry out one or more functions, and
- one or more links connecting the units, the respective module unit being connected to the link in question via a connection arrangement or a connection point or requisite communication device for a CAN protocol,
- characterized in that the connection arrangement or connection point for a first module unit comprises one or more communication devices that are free-standing or integrated in a microprocessor chip comprising at least a microprocessor (CPU) which is arranged to carry out instructions synchronously with and interworking with a state machine of a CAN control unit,
- characterized in that a message is arranged to initiate reading or writing when it appears on the link with a previously determined CAN identifier, and
- characterized in that the microprocessor in the module is arranged to initiate reading or writing by means of a command.

14. Arrangement as claimed in claim 13, characterized in that bit timing registers are arranged to be readable and writable via the link.

15. Arrangement as claimed in claim 13, characterized in that filters for receiving and/or sending messages are arranged to be readable and writable via the link.

16. Arrangement as claimed in claim 13, characterized in that an algorithm for receiving and/or sending can be downloaded to the control unit(s) via the link.

17. Arrangement as claimed in claim 13, characterized in that instructions for the appearance/function of the control unit(s) can be downloaded to the control unit via the link.

18. Arrangement as claimed in claim 2, characterized in that the system works or interworks with a Bluetooth protocol.

19. Arrangement as claimed in claim 1, characterized in that a same CAN identifier that sends system control messages also sends a bit pattern concerned.

20. Distributed control or monitoring arrangement comprising:
- devices in or belonging to control, monitoring and/or vehicle systems that comprise separate or locally deployed (distributed) module units (nodes) that carry out one or more functions, and
- one or more links connecting the units, the respective module unit being connected to the link in question via a connection arrangement or a connection point or requisite communication device for the a CAN protocol,
- characterized in that the connection arrangement or connection point for a first module unit comprises one or more communication devices that are free-standing or integrated in a microprocessor chip comprising at least a microprocessor (CPU) which is arranged to carry out instructions synchronously with and interworking with a state machine of a CAN control unit,
- characterized in that the CAN control unit can be set in a mode in which it transmits a dominant pulse upon command, and
- characterized in that the dominant pulse is one bit quantum in length.

21. Arrangement as claimed in claim 1, characterized in that the CAN control unit can be set in a mode in which it transmits a dominant pulse upon the detection of a falling edge on the bus.

22. Arrangement as claimed in claim 1, characterized in that the CAN control unit can be set in a mode in which it does not participate in the CAN communication, but captures or receives a clock value transmits a dominant pulse upon the detection of a failing edge on the bus.

23. Arrangement as claimed in claim 1, characterized in that the CAN control unit works synchronously with the CPU during all or parts of a reception and/or transmission sequence.

24. Arrangement as claimed in claim 1, characterized in that the CAN control unit and the CPU are arranged to be driven by a clock where the clock pulses are adjusted to follow a frequency of a global clock in the system.

25. Arrangement as claimed in claim 1, characterized in that the CAN control unit and the CPU are arranged to work synchronously with global time.

26. Arrangement as claimed in claim 1, characterized in that the CPU is arranged to read and/or write in the send buffer and/or receive buffer of the CAN control unit while there is CAN traffic on the bus.

27. Arrangement as claimed in claim 1, characterized in that the CAN control unit has a common send buffer and receive buffer.

28. Distributed control or monitoring arrangement comprising:
- devices in or belonging to control, monitoring and/or vehicle systems that comprise separate or locally deployed (distributed) module units (nodes) that carry out one or more functions, and
- one or more links connecting the units, the respective module unit being connected to the link in question via a connection arrangement or a connection point or requisite communication device for a CAN protocol,
- characterized in that the connection arrangement or connection point for a first module unit comprises one or more communication devices that are free-standing or integrated in a microprocessor chip comprising at least a microprocessor (CPU) which is arranged to carry out instructions synchronously with and interworking with a state machine of a CAN control unit,
characterized in that it comprises a clock unit that can be driven by an oscillator, in that a pre-scaler is arranged to adjust pulse trains outgoing from the clock unit/oscillator, in that the pre-scaler is arranged to generate an outgoing clock pulse after a number of pulses N from the oscillator, in that the outgoing pulse is arranged to be able to be adjusted to N+1 or N−1, when a value in a phase adjustment register is reached resulting in adjustment of the clock unit and in that statistical errors present can be adjusted by a value in a register for statistical errors being added to a local time.

29. Arrangement as claimed in claim 28, characterized in that the CPU is arranged to calculate the said register values and write them in the register.

30. Arrangement as claimed in claim 1, characterized in that the CAN control unit or connection arrangement in a first module unit is arranged with at least one memory area, a content of which is readable and/or writable via the link from a second module unit in the system without significant assistance from any function performing microprocessor in the first module unit.

* * * * *